US007142413B2

(12) United States Patent
Sugimoto et al.

(10) Patent No.: US 7,142,413 B2
(45) **Date of Patent: *Nov. 28, 2006**

(54) PORTABLE TRANSMITTER HAVING SPACE FOR CONTAINING MECHANICAL KEY

(75) Inventors: Keiichi Sugimoto, Kariya (JP); Mitsuru Nakagawa, Chiryu (JP)

(73) Assignee: Denso Corporation, Kariya (JP)

( * ) Notice: Subject to any disclaimer, the term of this patent is extended or adjusted under 35 U.S.C. 154(b) by 229 days.

This patent is subject to a terminal disclaimer.

(21) Appl. No.: 10/819,963

(22) Filed: Apr. 8, 2004

(65) Prior Publication Data

US 2004/0201512 A1 Oct. 14, 2004

(30) Foreign Application Priority Data

Apr. 10, 2003 (JP) ............................ 2003-106722

(51) Int. Cl.
*G06F 1/16* (2006.01)
*G06F 7/00* (2006.01)

(52) U.S. Cl. ...................... 361/679; 340/5.62; 341/173

(58) Field of Classification Search ............ 174/66–67; 340/5.21, 5.26, 539.11; 307/10.2, 10.3; 341/173; 361/679–687, 724–727

See application file for complete search history.

(56) References Cited

U.S. PATENT DOCUMENTS 5,592,169 A * 1/1997 Nakamura et al. .......... 341/173
5,679,984 A * 10/1997 Talbot et al. ............. 307/10.3
6,460,386 B1 10/2002 Watanuki et al.
6,474,123 B1 11/2002 Kito et al.
2004/0201451 A1* 10/2004 Sugimoto et al. .......... 340/5.62

FOREIGN PATENT DOCUMENTS

JP A-58-80101 5/1983

* cited by examiner

*Primary Examiner*—Hung Van Duong
(74) *Attorney, Agent, or Firm*—Posz Law Group, PLC

(57) ABSTRACT

An ID code is wirelessly sent to a device, such as a keyless-entry system or a keyless-starter system mounted on an automobile, from a portable transmitter. Electronic components including an electronic circuit board, a transponder and a battery are all contained in a resin case. A mechanical key that is to be used to open the door when the battery voltage is too low to operate the system is also contained in the case. The battery contained in the case is covered with the battery cover which is fixed to the case with screws. The battery cover is further covered with a sliding cover that slides in the same direction in which the mechanical key is taken out. The sliding cover and the mechanical key is locked in their respective positions by hooks which are released with a common lever.

3 Claims, 5 Drawing Sheets

PORTABLE TRANSMITTER HAVING SPACE FOR CONTAINING MECHANICAL KEY

CROSS-REFERENCE TO RELATED APPLICATION

This application is based upon and claims benefit of priority of Japanese Patent Application No. 2003-106722 filed on Apr. 10, 2003, the content of which is incorporated herein by reference.

BACKGROUND OF THE INVENTION

1. Field of the Invention

The present invention relates to a portable transmitter, which is advantageously used as a transmitter in a keyless-entry system for an automobile and in a keyless-starter system.

2. Description of Related Art

In a portable transmitter for the keyless-entry system, a battery is usually contained in a transmitter case. Under a normal condition where the battery voltage is normal, a door key of an automobile is locked or unlocked when an ID code (an identification code) sent form the transmitter coincides with an ID code pre-installed in the automobile. Under an abnormal or emergency condition where the battery voltage is too low to operate the system, a mechanical key contained in the transmitter case is taken out to lock or unlock the door.

Usually, the battery and the mechanical key are contained in respective spaces formed in the transmitter case. The battery, for example, is loaded from an opening, and the opening is closed with a battery cover. A seal member such as an O-ring is disposed around the opening between the case and the battery cover to keep the inner space water-tight. The battery cover is fixed to the case with screws so that the battery cover can be removed when necessary for changing an old battery to new one. Alternatively, the battery cover is snap-fitted to the opening.

In such conventional structures for containing the battery or the mechanical key in the case, the following problems are involved. If the battery cover is fixed to the case with screws, the heads of screws expose to the outer surface of the transmitter case, which damages an ornamental design of the case. If the battery cover is snap-fitted to the opening, the battery cover will come off from the case when the user of the transmitter inadvertently drops it on the ground. Further, the battery cover may be deformed by heat stress under an influence of repulsive force of the O-ring compressed between the case and the battery cover, which also damages the ornamental design. A similar problem will be involved in the space for containing the mechanical key.

SUMMARY OF THE INVENTION

The present invention has been made in view of the above-mentioned problem, and an object of the present invention is to provide an improved portable transmitter, in which the mechanical key and the battery are contained in a transmitter case firmly and to be easily taken out without damaging the ornamental design of the case.

The portable transmitter includes an electronic circuit board, a battery for supplying power to the electronic circuit board, and a transponder, all these components being contained in a resin case. An ID code (an identification code) that allows a device to be operated upon receipt of the ID code is wirelessly transmitted from the portable transmitter to the device such as a keyless-entry system or a keyless-starter system for an automobile.

The resin case of the portable transmitter is composed of a front case and a rear case, both being firmly connected not to be easily separated. A mechanical key which is used to open the door when the battery voltage is too low to operate the transmitter is contained in the case. The mechanical key is locked in position by a key hook. The battery is also contained in the case, and an opening for loading and unloading the battery is formed on the rear surface of the case. The battery is covered with a battery cover that is fixed to the case with screws. The battery cover is further covered with a sliding cover that is locked in position by a cover hook. The sliding cover slides in the same direction as the direction in which the mechanical key is taken out from the key space. Both the key hook and the cover hook are commonly linked to a lever that simultaneously releases both hooks.

According to the present invention, the mechanical key and the battery are contained in the transmitter case firmly and to be easily taken out when necessary, without damaging the ornamental design of the portable transmitter.

Other objects and features of the present invention will become more readily apparent from a better understanding of the preferred embodiment described below with reference to the following drawings.

DETAILED DESCRIPTION OF THE PREFERRED EMBODIMENT

Figure 1:
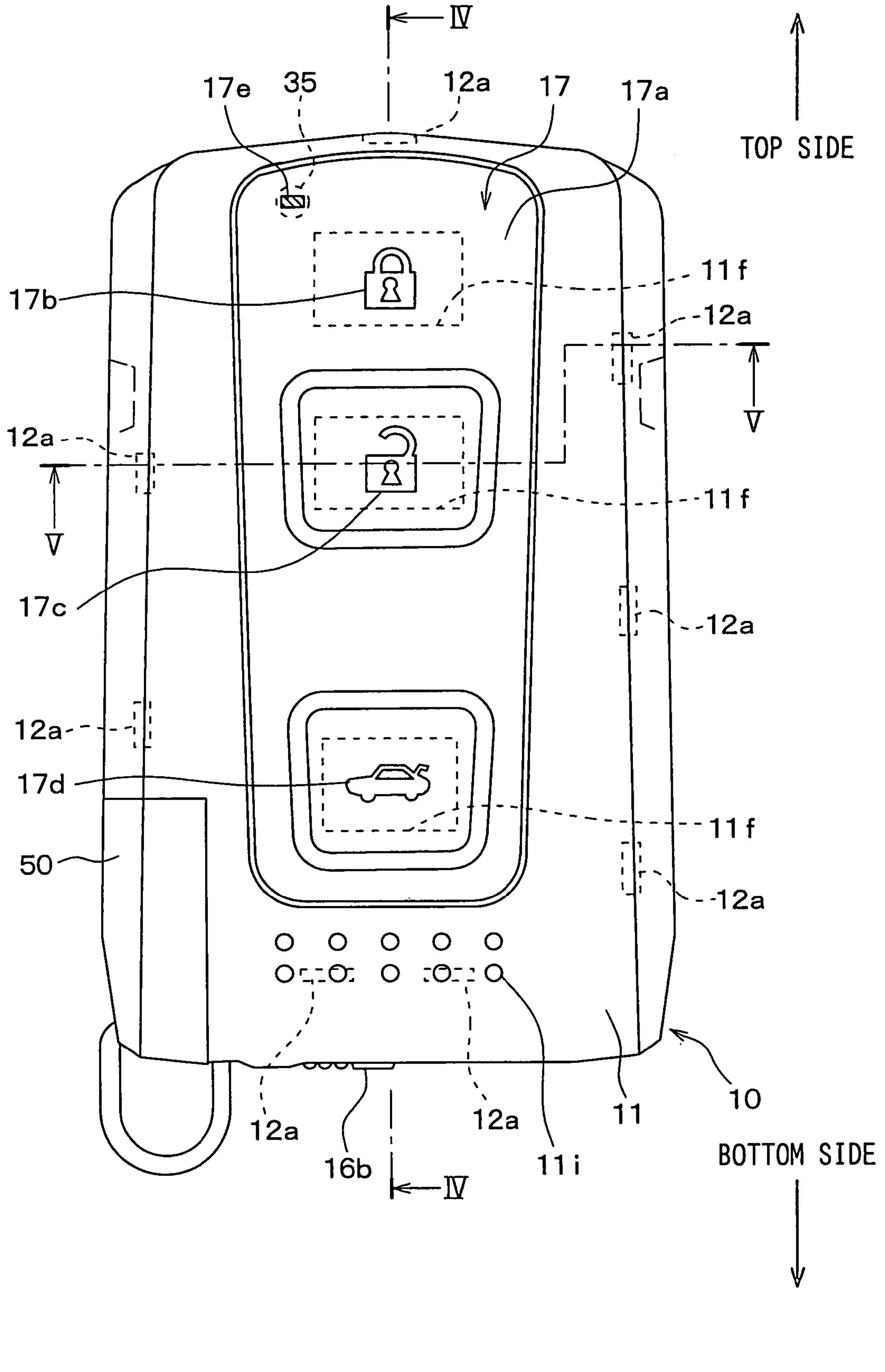
FIG. 1 is a plan view showing a portable transmitter according to the present invention, viewed from a front side thereof.

A preferred embodiment of the present invention will be described with reference to accompanying drawings. As an example of the portable transmitters of the present invention, a transmitter for used in a keyless-entry system of an automobile will be described. In the keyless-entry system, as well known, an identification code (ID code) is wirelessly transmitted to an automobile from a portable transmitter. When the ID code sent from the transmitter coincides with an ID code pre-stored in the automobile, the door is automatically locked or unlocked according to a signal showing an intention of the user. In this manner, the user of the automobile is able to lock or unlock the door without using a mechanical key from a position a certain distance apart from the automobile.

A keyless-starter system is also known hitherto. In the keyless-starter system, an automobile engine is automatically started upon receipt of an ID code wirelessly transmitted from a portable transmitter. Thus, the engine can be started without using a mechanical key in the similar manner as in the keyless-entry system. The portable transmitter according to the present invention is also applicable to other wireless control systems such as a system for starting a motor in an electric vehicle.

Referring to FIGS. 1–7, the structure and the function of the portable transmitter of the present invention will be described. The portable transmitter is composed of a resin case 10 and components contained therein. The components include a battery (a button-type) 20, an electronic circuit board 30, a transponder 40 and a mechanical key 50.

The case 10 is composed of a front case 11 and a rear case 12, both being connected not to be separated from each other (undetachably connected). The components of the transmitter are contained therein before the front case 11 is connected to the rear case 12. The structure connecting the front case 11 to the rear case 12 is better seen in FIG. 5. The front case 11 includes plural front hooks 11*a* extending toward the rear case 12, and the rear case 12 includes plural rear hooks 12*a* for engaging with the front hooks 11*a*. A projection formed on the front hook 11*a* engages with a depression formed on the rear hook 12*a*. Similarly, a projection formed on the rear hook 12*a* engages with a depression formed on the front hook 11*a*. Therefore, it is impossible to separate the front case 11 from the rear case 12 without breaking either one of the front hook 11*a* or the rear hook 12*a*.

Figure 4:
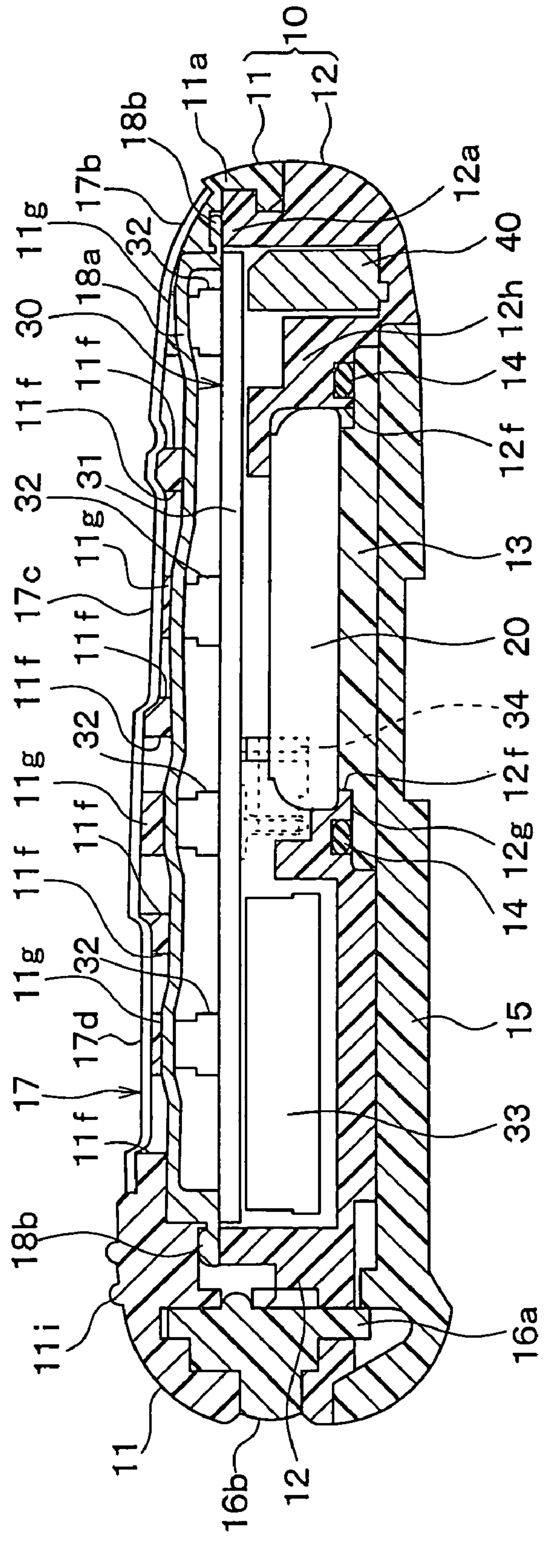
FIG. 4 is a cross-sectional view showing the transmitter, taken along line IV—IV shown in FIG. 1.

As shown in FIG. 4, the battery 20 that supplies power to the electronic circuit board 30 is contained in the case 10. The battery 20 can be loaded or unloaded through an opening 12*f* formed in the rear case 12 without separating the front case 11 form the rear case 12. A projected lip 12*g* extending toward the opening 12*f* serves as a member for preventing the battery 20 from dropping off. A battery cover 13 closing the opening 12*f* is fixed to the rear case 12 with screws N (shown in FIG. 6). The battery cover 13 can be removed by loosening the screws N when necessary for replacing a worn battery with a new one. A seal member 14 (an O-ring made of rubber) is disposed around the opening 12*f* to be compressed with the battery cover 13 to thereby keep the inner space water-tight.

Figure 6:
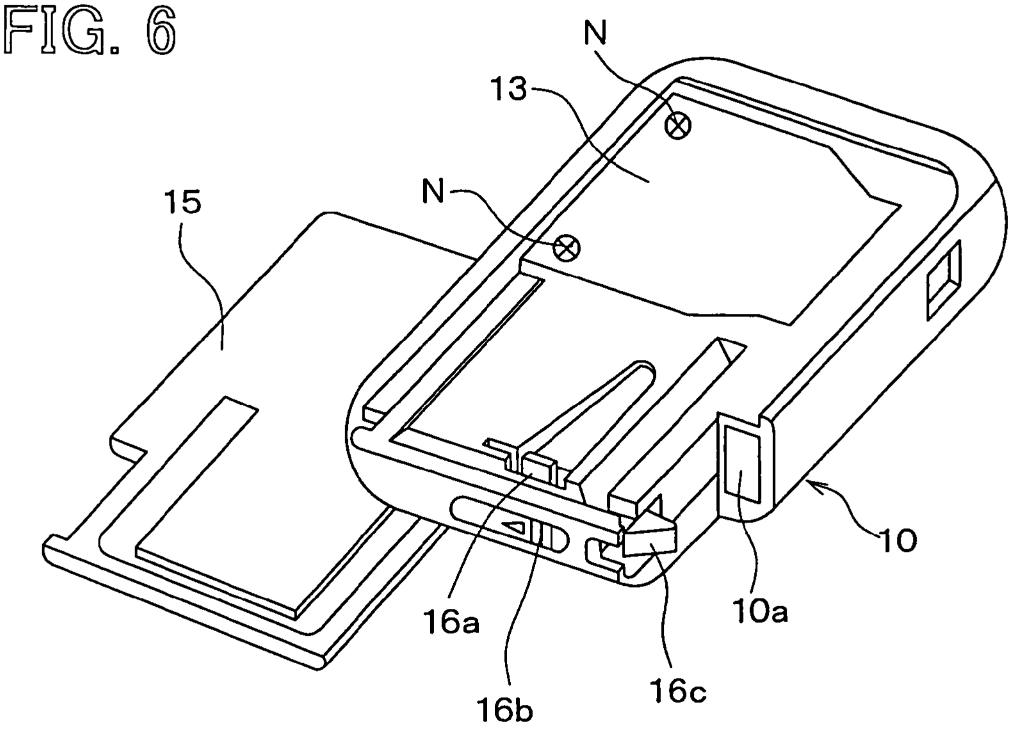
FIG. 6 is a perspective view showing the rear side of the transmitter, with a sliding cover covering an opening at the rear side removed.
Figure 7:
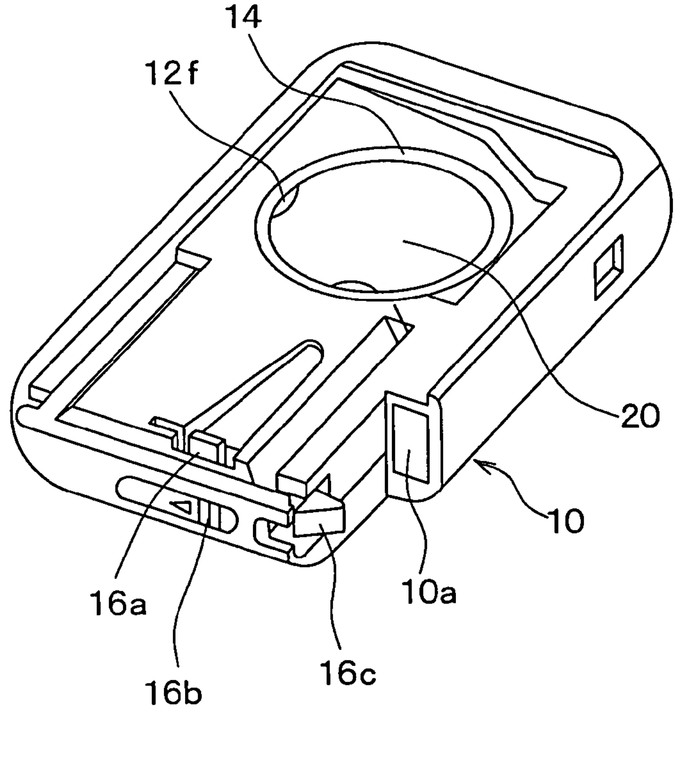
FIG. 7 is a perspective view showing the rear side of the transmitter, with both of a sliding cover and a battery cover removed.

The rear surface of the transmitter is covered with a sliding cover 15 after the battery cover 13 is fixed to the rear case 12 with the screws N. FIG. 6 shows the rear side of the transmitter with the sliding cover 15 removed, and FIG. 7 shows the rear side with both of the battery cover 13 and the sliding cover 15 removed. The sliding cover 15 can be fixed to or removed from the rear surface by sliding the sliding cover 15 in the longitudinal direction (in the direction from the top side to the bottom side) of the case 10.

As shown in FIGS. 6 and 7, a cover hook 16*a* for stopping the sliding cover 15 at its position is provided on the rear surface of the case 10. A lever 16*b* connected to the cover hook 16*a* is provided at the bottom side of the case 10. The cover hook 16*a* stopping the sliding cover 15 is released by operating the lever 16*b*. The mechanical key 50 is contained in a key space 10*a* formed in the case 10. The mechanical key 50 can be taken out from the key space 10*a* by releasing a key hook 16*c* and by sliding the mechanical key 50 in the longitudinal direction (from the top side to the bottom side) of the case 10. The key hook 16*c* functions to fixedly contain the mechanical key 50 in the key space 10*a*. The key hook 16*c* is also connected to the lever 16*b*. The key hook 16*c* can be moved to the position releasing the mechanical key 50 by operating the lever 16*b*.

As shown in FIG. 4, the electronic circuit board 30 is formed by mounting tact switches 32, an antenna 33, a terminal 34, an integrated circuit and other components on a printed circuit board 31. The printed circuit board 31 is fixedly mounted on the rear case 12 from its front side. The tact switches 32 are positioned on the front surface of the printed circuit board 31. The terminal 34 to be connected to a plus terminal of the battery 20, another terminal to be connected to a minus terminal of the battery 20, and the antenna 33 are mounted on the rear surface of the printed circuit board 31.

The transponder 40 is press-fitted to the rear case 12 so that it can be firmly fixed to the rear case 12. The transponder 40 is separated from the battery 20 by a separating wall 12*h* to prevent the transponder 40 from being taken out from the opening 12*f* when the battery cover 13 is removed. The electronic circuit board 30 is powered by the battery 20 and is adapted to automatically transmit the ID code. When the tact switch 32 is pushed by the user, the ID code is transmitted from the electronic circuit board 30.

Figure 5:
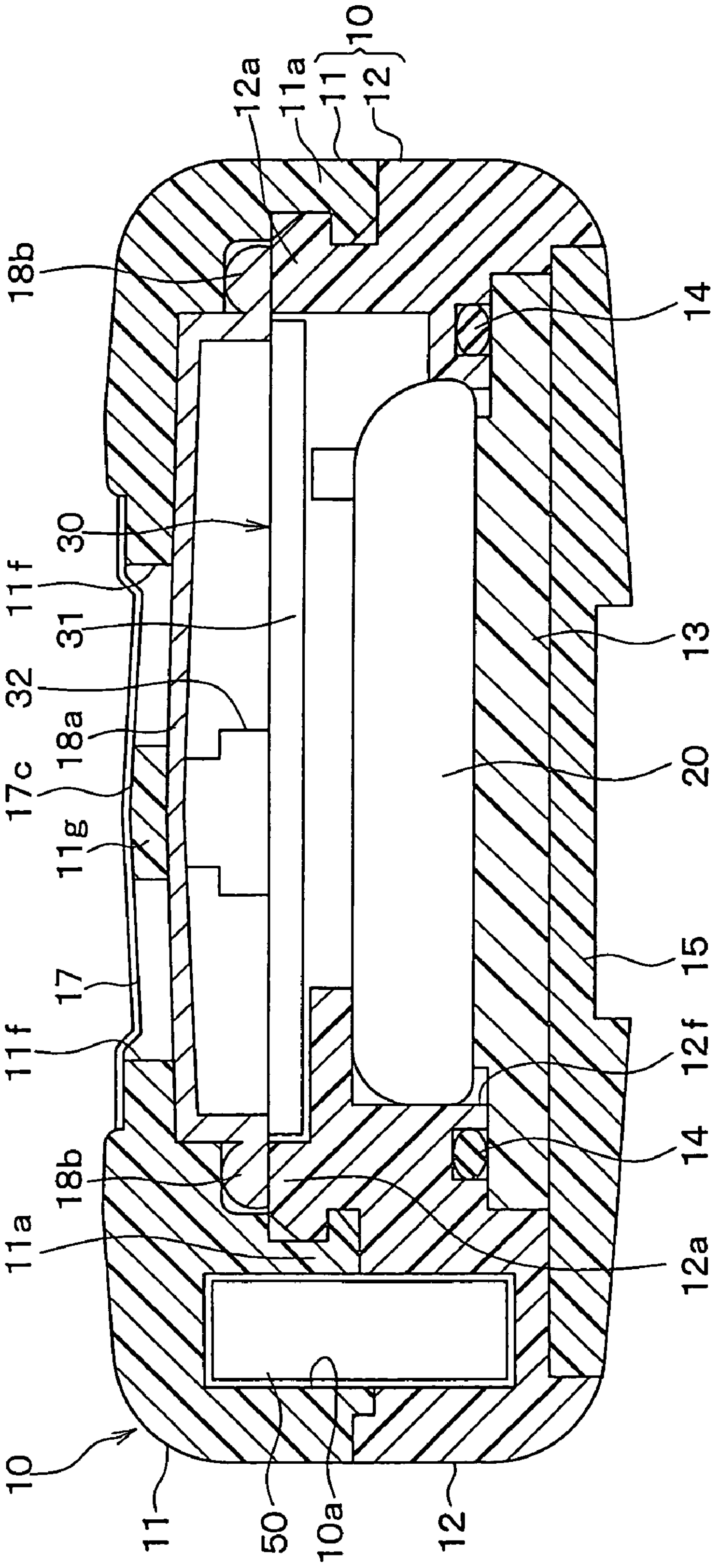
FIG. 5 is a cross-sectional view showing the transmitter, taken along line V—V shown in FIG. 1.

As shown in FIGS. 1, 4 and 5, openings 11*f* corresponding to the respective tact switches 32 are formed on the front surface of the front case 11. The openings 11*f* are covered with a front film 17 that is integrally formed with the front case 11. By pushing the front film 17 at a position corresponding to a particular tact switch 32, the tact switch 32 can be operated. The front film 17 is formed by printing function displays 17*b*, 17*c*, 17*d* (pictures or letters showing functions) on the rear surface of a transparent resin film 17*a*. Since the function displays are printed on the rear surface, they are not erased by frequently touching the front surface. Background designs or pictures are also printed on the rear surface of the front film 17 to enhance the ornamental design of the transmitter by hiding the components located behind the front film 17.

A repulsive force against a force pushing the tact switch 32 is a sum of a spring back force of the tact switch itself and a resilient force of the front film 17. As the size of the opening 11*f* becomes smaller, the resilient force against the force pushing the tact switch 32 becomes larger. Therefore, the size of the opening 11*f* is determined to obtain an optimum repulsive force against the force pushing the tact switch 32.

As shown in FIG. 1, the function display 17*b* corresponds to a door-lock function, 17*c* to a door-unlock function and 17*d* to a trunk-opening function. That is, when the tact switch 32 corresponding to the function display 17*b* is pushed, a signal for locking the door is transmitted. When the tact switch 32 corresponding to the function display 17*c* is pushed, a signal for unlocking the door is transmitted. Similarly, when the tact switch 32 corresponding to the function display 17*d* is pushed, a signal for opening a trunk is transmitted. Though four tact switches 32 are provided as shown in FIG. 4, only three functions are allocated to the respective tact switches 32 as shown in FIG. 1. Therefore, in this particular arrangement, one more function can be allocated to the vacant tact switch 32.

The front film 17 is integrally molded together with the front case 11, leaving the openings 11*f* un-molded. Therefore, each opening 11*f* is circularly surrounded by the molded portion. Thus, the openings 11*f* are sealed by the molded portion and kept water-tight. A spacer 11*g* formed together with the front case 11 by resin molding is disposed between the front film 17 and each tact switch 32. The thickness of the spacers 11*g* is different from spacer to spacer to adjust a distance between the front film 17 and each tact switch 32. This adjustment is necessary because the front film 17 is not flat but curved as shown in FIG. 4.

The plane shape of the spacer 11*g* is substantially the same as the plane shape of the tact switch 32. It is round in this particular embodiment. The plane area of the spacer 11*g* is made a little larger than the plane area of the tact switch 32.

As shown in FIGS. 4 and 5, a seal member 18*b* is disposed between the front case 11 and the rear case 12 to seal the portion connecting both cases 11, 12. The sealing member 18*b* is integrally formed with a water-preventing cover 18*a* that covers an entire surface of the electronic circuit board 30. The seal member 18*b* including the water-preventing cover 18*a* is made of a rubber material.

Referring again to FIG. 1, a light source 35 such as a light emitting diode is provided in the case 10, and the light from the light source 35 is emitted through a transparent portion 17*e* of the front film 17. In this embodiment, the light is lit when the battery voltage is normal, and the light is turned off when the battery voltage decreases to a level that is unable to operate the electronic circuit board 30.

Figure 2:
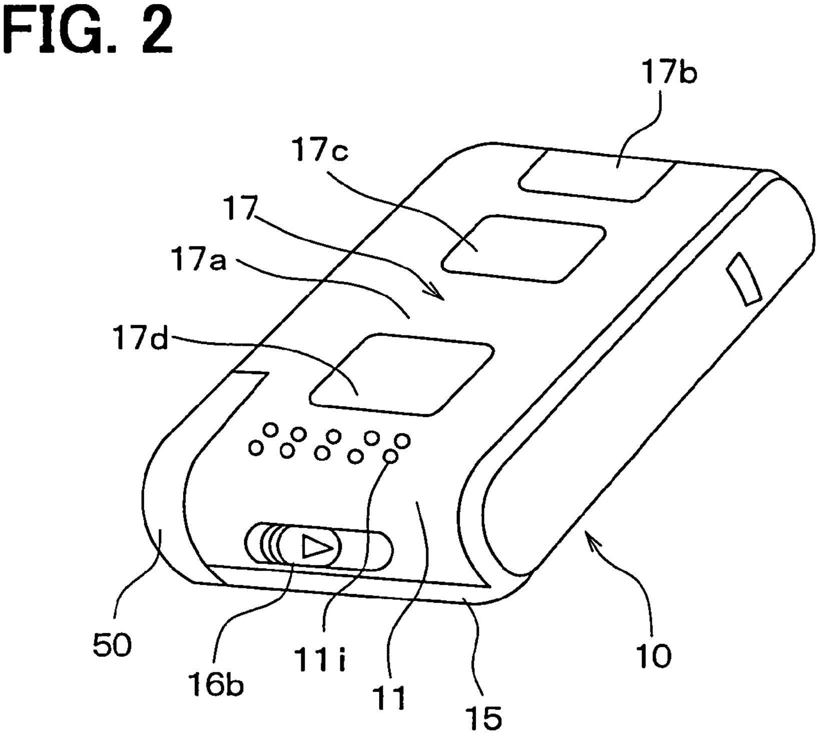
FIG. 2 is a perspective view showing front and bottom sides of the portable transmitter shown in FIG. 1.
Figure 3:
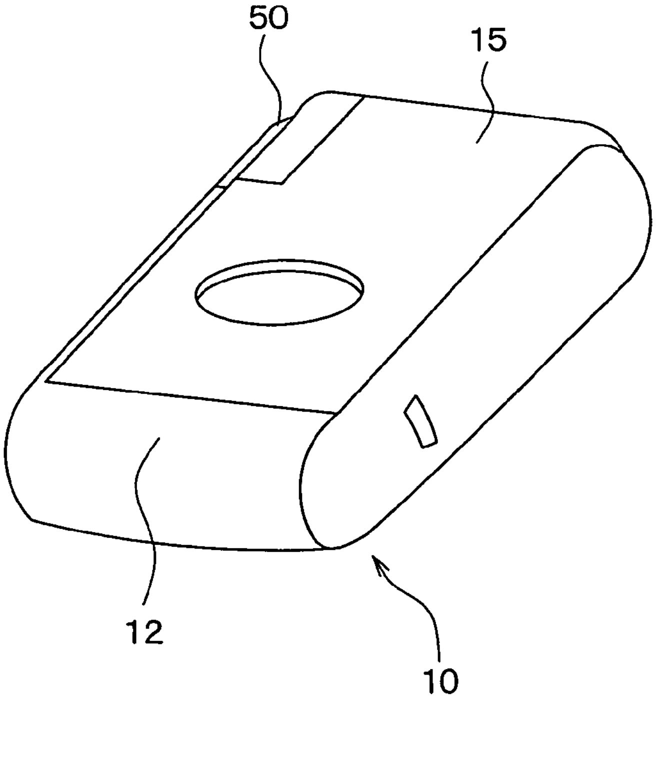
FIG. 3 is a perspective view showing rear and top sides of the same portable transmitter.

As shown in FIGS. 1 and 2, plural projections 11*i* are formed on the front surface of the front case 11, so that the user can recognize the top side and the bottom side of the transmitter by blind-touch. As seen in FIG. 4, portions of the front film 17 corresponding to the function displays 17*b*, 17*c*, 17*d* are a little depressed from other portions, so that the user can find the respective function displays by blind-touch. Depressing the portions corresponding to the function displays also helps avoid unintended operation of the transmitter.

Now, operation of the transmitter will be described. First, operation under a normal condition where the battery voltage is normal, i.e., higher than a predetermined level will be explained. When the transmitter is located within a first area which is apart from an automobile by a predetermined distance, a receiver mounted on the automobile receives the ID code automatically transmitted from the transmitter. If the ID code pre-installed in the receiver coincides with the ID code transmitted from the transmitter, an actuator for locking or unlocking the door is operated.

On the other hand, when the transmitter is located in a second area which is farther from the automobile than the first area, the ID code transmitted from the transmitter is not received by the receiver mounted on the automobile. In this case, the ID code is transmitted from the transmitter by manually pushing the tact switch 32, and this ID code can be received by the receiver. Upon receiving the ID code, the actuator is similarly operated. In this manner, the door is locked or unlocked without using a mechanical key.

In the case of the keyless-starter system, when the user possessing the transmitter sits on the automobile seat, the ID code automatically transmitted from the transmitter is received by the on-board receiver. If the received ID code coincides with a pre-installed ID code, an ignition switch is turned on and an engine is started. Thus, the engine is automatically started without using a mechanical key.

Secondly, operation under an abnormal condition where the voltage of the battery 20 dropped to a voltage level that is unable to operate the electronic circuit board 30 for transmitting the ID code will be explained. The user may take out the mechanical key 50 contained in the transmitter by operating the lever 16*b* to release the key hook 16*c*. The user may lock or unlock the door with this mechanical key 50.

When the user wants to start the engine under the abnormal condition, the user inserts the transmitter into a slot formed near a driver's seat. A caller installed in the slot sends a signal requesting the ID code to the transponder 40 contained in the transmitter. Electric power is automatically supplied to the transponder 40 from the automobile by means of electromagnetic induction, and the transponder 40 transmits the ID code to an on-board receiver. If the ID code received by the on-board receiver coincides with a pre-installed ID code, the ignition switch is turned on to start the engine. The ID codes mentioned above are all encrypted for security purpose.

According to the present invention, since the battery cover 13 is fixed to the rear case 12 with screws N, the battery cover 13 does not come off even when the transmitter is inadvertently dropped on the ground. Since the screws N are covered with the sliding cover 15, the ornamental design is not damaged by the screws N. Further, if the battery cover 13 is deformed by a heat stress or the like, the deformed battery cover does not damage the ornamental design of the portable transmitter since the battery cover 13 is invisibly covered with the sliding cover 15.

Since the sliding cover 15 is locked by the cover hook 16*a*, the sliding cover 15 does not slide off even when a certain mechanical impact is given to the case 10. In addition, since the cover hook 16*a* and the key hook 16*c* are linked commonly to the lever 16*b*, both of the sliding cover 15 and the mechanical key 50 can be released by operating the single lever 16*b*.

The present invention is not limited to the embodiment described above, but it may be variously modified. For example, though the first area where the ID code is automatically transmitted and the second area where the ID code is manually transmitted are provided in the foregoing embodiment, it is, of course, possible to eliminate the first area. In other words, the ID code may be transmitted only by pushing the tact switch 32.

The present invention is applied to the transmitter used in the keyless-entry system and the keyless-starter system in the foregoing description. However, the transmitter according to the present invention may be used in other systems. Further, application of the present invention is not limited to the automotive systems, but it may be applied to other systems such as a keyless-entry system for doors of independent houses or apartment rooms.

While the present invention has been shown and described with reference to the foregoing preferred embodiment, it will be apparent to those skilled in the art that changes in form and detail may be made therein without departing from the scope of the invention as defined in the appended claims.

What is claimed is:

1. A portable transmitter for transmitting signals to a device to be operated, the portable transmitter having a case, electronic components and a battery for supplying power to the electronic components, the electronic components and the battery being contained in the case, the case comprising:

a key space for containing a mechanical key therein;

a key hook for keeping the mechanical key in position in the key space;

a releasing lever for releasing the key hook to take out the mechanical key from the key space;

an opening for loading and unloading the battery;

a battery cover closing the opening, the battery cover being fixed to the case with screws;

a seal member disposed between the battery cover and the case to be compressed therebetween to thereby seal the opening;

a sliding cover covering the battery cover and the screws, the sliding cover being slidably removable from the case; and a cover hook for locking the sliding cover in its closing position, wherein:

the cover hook is simultaneously released when the key hook is released by operating the releasing lever.

2. The portable transmitter as in claim 1, wherein:

the sliding cover slides in the same direction as the mechanical key is taken out from the key space.

3. The portable transmitter as in claim 2, wherein:

the case is substantially box-shaped, having longer sides and shorter sides; and the sliding cover slides in the direction parallel to the longer sides.

* * * * *